(12) United States Patent
Monz et al.

(10) Patent No.: US 7,692,777 B1
(45) Date of Patent: Apr. 6, 2010

(54) OPTICAL CLINOMETER

(75) Inventors: Ludwin-Heinz Monz, Ulm (DE); Andreas Glimm, Weimar (DE)

(73) Assignee: Trimble Jena GmbH, Jena (DE)

(*) Notice: Subject to any disclaimer, the term of this patent is extended or adjusted under 35 U.S.C. 154(b) by 0 days.

(21) Appl. No.: 09/674,763

(22) PCT Filed: Apr. 28, 1999

(86) PCT No.: PCT/EP99/02868

§ 371 (c)(1),
(2), (4) Date: Feb. 15, 2001

(87) PCT Pub. No.: WO99/57513

PCT Pub. Date: Nov. 11, 1999

(30) Foreign Application Priority Data

May 4, 1998 (DE) .................... 198 19 610

(51) Int. Cl.
*G01C 1/04* (2006.01)
(52) U.S. Cl. .................... 356/139.1
(58) Field of Classification Search ............ 33/366.12, 33/366.16, 366.23; 356/139.1
See application file for complete search history.

(56) References Cited

U.S. PATENT DOCUMENTS 5,371,951 A * 12/1994 Piske
5,392,112 A * 2/1995 Nakamura ............ 356/139.1
6,057,916 A * 5/2000 Kitajima ............... 356/139.1
6,088,090 A * 7/2000 Hoshi et al. ........... 356/139.1

FOREIGN PATENT DOCUMENTS

CH 673 707 3/1990
DE 196 10 941 9/1997

* cited by examiner

*Primary Examiner*—Isam Alsomiri
(74) *Attorney, Agent, or Firm*—Townsend and Townsend and Crew LLP

(57) ABSTRACT

The invention is directed to an optical clinometer comprising a housing or vessel with a transparent liquid which forms a liquid horizon and which is suitable for changing the direction of at least one optical beam bundle depending on inclination. At least one light source is provided for illuminating at least one structure or for generating at least one light point or light spot. An optical device is responsible for imaging the at least one structure or the at least one light point or light spot through the liquid and by of total reflection at the surface of the liquid on photoelectric sensor elements of at least one line-shaped or surface-shaped sensor arrangement, wherein the optical device for imaging the structure or the light point or light spot is arranged on the underside of the bottom of the housing or are a component part of this bottom, and the optical device is formed of an individual optical element which couples light in and out and images the structure or the light point or light spot.

19 Claims, 3 Drawing Sheets

OPTICAL CLINOMETER

BACKGROUND OF THE INVENTION a) Field of the Invention

The invention is directed to an optical clinometer according to the preamble of the first patent claim for measuring the inclination of devices, machines and workpieces. It is intended particularly for application in or on geodetic devices.

b) Description of the Related Art

Apart from clinometers with pendulums and bubble levels, there are known devices which comprise one or more liquid vessels containing a liquid and a gas or at least two immiscible liquids with different optical or electrical properties.

DE 41 10 858 and U.S. Pat. No. 5,392,112 describe clinometers with an inclination-sensitive and beam-deflecting sensor through which a geometric figure, an optical structure or a light point or light spot is imaged on a linear array of CCD elements. The imaging of the figure or structure is carried out through input-coupling elements and through imaging optics, either through the liquid horizon (liquid-gas interface or liquid-liquid interface) or on the linear array after reflection at the liquid horizon. When the device is inclined, there is a change in direction of the illumination beam bundle from a normal position either by refraction at the liquid horizon which is inclined relative to the beam path, wherein the liquid behaves like an optical wedge, or by altered reflection conditions at the liquid horizon in which the angle of incidence of the illumination beam bundle and the reflection angle of the beam bundle reflected at the liquid horizon change. The inclination is determined in two coordinate directions from the changed position of the figure that is imaged on the linear array.

It is further known from U.S. Pat. No. 5,392,112 to use a surface CCD sensor for determining the angle of inclination in two dimensions.

These known clinometers use position-sensitive surface sensors or strip sensors as sensors for determining the position of the centroid of light or use CCD line sensors for evaluating a lightness structure. Because of the restricted linearity of differential sensors and strip sensors and because of the limited information content that can be achieved on linear line sensors (limitation of the minimum structure width through imaging errors, image field size and pixel length), longer focal lengths of the optical system and, therefore, greater extension of the measuring device and a limited measurement area or limited high-resolution measurement area are required in order to achieve a high resolution. This effect is particularly strong in clinometers based on the principle of light refraction in passing through the gas-liquid interface or boundary layer, since the deflection of the light beam during a change in inclination amounts to only a fraction of the deflection during reflection.

A two-axis clinometer with a housing containing a liquid with a free surface and with a projected structure which is reflected on the liquid surface and imaged on a receiver arrangement through imaging elements is known from DE 196 10 941.

These clinometers have a vessel made of glass or another light-permeable material, wherein the bottom of the vessel is a plane-parallel plate at which input-coupling and output-coupling elements and collimating and imaging optical elements are arranged. The collimating and imaging elements are located at a certain distance from the respective coupling elements which are constructed as prisms. All of these optical elements are quite expensive due to their manufacturing technology. Their size is decisive for the size of the clinometer.

OBJECT AND SUMMARY OF THE INVENTION

The primary object of the invention is to provide an optical clinometer which has a simple design, is constructed in a space-saving and robust manner, has a high mechanical stability, enables a highly precise inclination measurement extensively independent of temperature and can be produced economically.

According to the invention, this object is met in an optical clinometer comprising a housing or vessel with a transparent liquid which forms a liquid horizon and which is suitable for changing the direction of at least one optical beam bundle depending on inclination. At least one light source is provided for illuminating at least one structure or for generating at least one light point or light spot. An optical device is responsible for imaging the at least one structure or the at least one light point or light spot through the liquid and by total reflection at the surface of the liquid on photoelectric sensor elements of at least one line-shaped or surface-shaped sensor arrangement, wherein the optical device for imaging the structure or the light point or light spot is arranged on the underside of the bottom of the housing or are a component part of this bottom, and the optical device is formed of an individual optical element which couples light in and out and images the structure or the light point or light spot.

For the purpose of a very simple production and a space-saving construction, it is particularly advantageous when the imaging element has the form of an individual thick piano-convex lens, wherein its plane surface faces the liquid. The optical element can be a segment with a spherical surface, for example, with a hemispherical surface which is arranged at the underside of the housing or vessel or is a component part of the housing. According to another construction of the invention, the optical element is a spherical segment or layer with an optically active spherical surface through which the beam path is coupled into and out of the liquid.

Further, it is advantageous when the optical element is a component part of the bottom of the housing or vessel whose shape is produced by cutting or without cutting. A construction of this kind is especially advantageous with respect to manufacturing and, moreover, is very robust. Further, it is possible to cement or glue the optical element to the underside of the bottom which closes the housing on the light source side. This optical element can also be glued or cemented into a recess or bore hole of the bottom. This connection must be carried out in a liquid-tight manner. In this arrangement, the plane surface of the optical element directly adjoins the liquid.

The optical element itself must be made of a material which is permeable to light, for example, an optical plastic or glass.

In another embodiment form of the invention, the housing and the imaging optical element form an individual component part.

In another embodiment form of the invention, the housing and the imaging optical element are an individual component part and the optical element is formed by a cup-shaped bulge in the bottom of the housing, the volume of the cup-shaped bulge is a component part of the volume of the housing and is filled with the same liquid as the rest of the housing or vessel.

In order to be able to carry out measurement of inclination in a plurality of coordinates, e.g., in both coordinates of the plane, without having to rotate the clinometer about its axis, there are advantageously at least two light sources arranged at an angular offset relative to one another and associated sensor arrangements are provided. Accordingly, it is possible to determine the inclination of a plane quickly and reliably.

The invention will be explained more fully in the following with reference to embodiment examples.

BRIEF DESCRIPTION OF THE DRAWINGS

In the drawings:

FIG. 2 shows a clinometer with an optical element which is cemented on or glued on;

DESCRIPTION OF THE PREFERRED EMBODIMENTS

Figure 1:
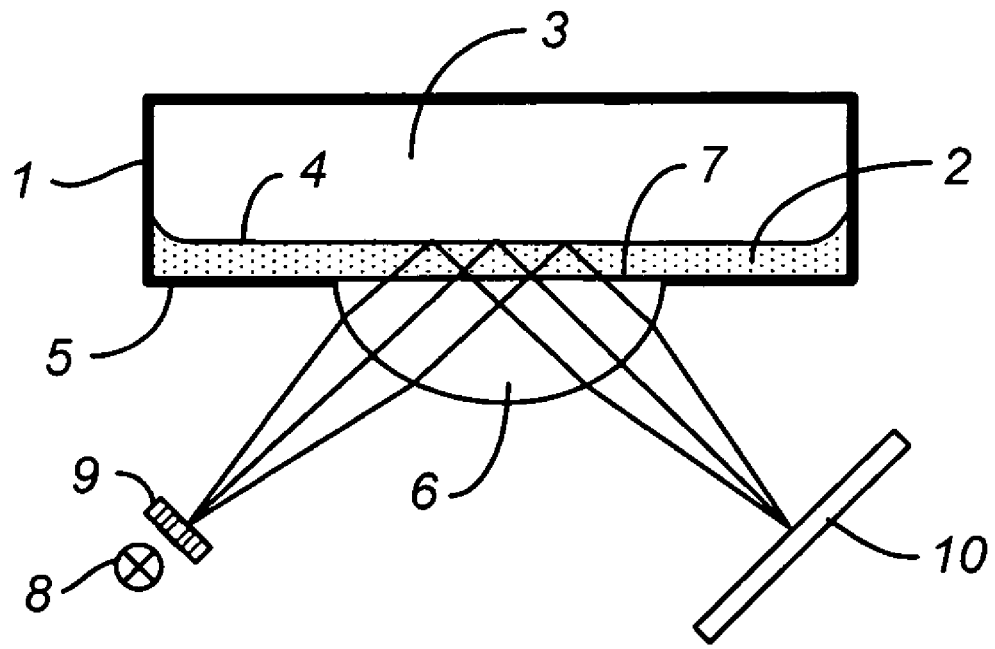
FIG. 1 shows a schematic view or a clinometer with an optical element inserted in the vessel bottom.

The optical clinometer which is shown schematically in FIG. 1 comprises a vessel or housing 1 which is partly filled with a liquid 2. In an advantageous manner, there is located above the liquid 2 a gas volume 3 or another liquid with an index of refraction differing from that of the liquid 2, so that total reflection of the light traversing the liquid 2 can be effected at the separating surface between the gas and liquid 2, that is, at the liquid surface 4. An imaging optical element 6 which is formed of a transparent material, for example, an optical plastic or glass, is inserted into the bottom 5 of the housing 1. This optical element 6 has the shape of a thick plano-convex lens whose plane surface 7 faces the liquid 2 and, as is shown in the Figure, directly adjoins the liquid 2. This optical element 6 can be constructed as a spherical segment.

As will likewise be seen from FIG. 1, a light source 8 is located below the bottom 5 and below the element 6 and illuminates a mark or structure 9 or a light point or light spot is generated by the light source 8. The structure 9 or light point or light spot is imaged through the element 6, through the liquid onto a sensor arrangement 10, wherein the optical element 6 functions simultaneously as a collimator, input- and output-coupling element and imaging objective. The surface region in the direction of the structure 9 is imaged by the collimator and the surface region of the element 6 facing the sensor arrangement 10 is imaged by the objective. The light source 8 and structure 9 and the sensor arrangement 10 are fixedly connected with the housing 1, so that when the clinometer is tilted there is a displacement of the image of the structure 9 on the sensor arrangement 10 which serves as a measure for the amount of inclination. The sensor arrangement 10 comprises sensor elements which are arranged in lines or areas in the form of a matrix. The sensor arrangements can also be constructed as position-sensitive arrangements, e.g., as quadrant photoreceivers or differential photoreceivers, known per se.

Figure 2:
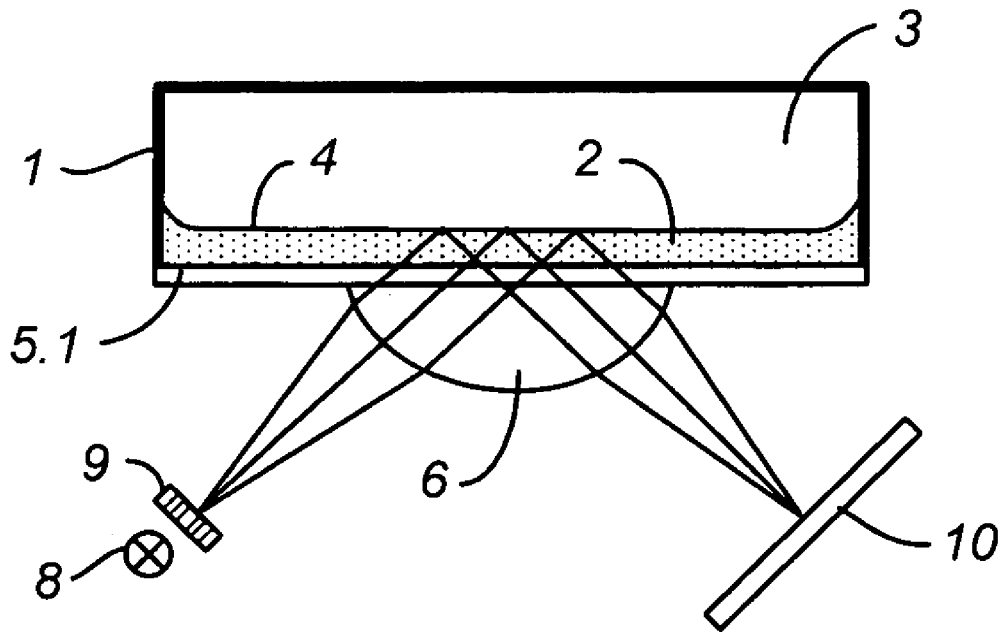

In the clinometer according to FIG. 2, the optical element 6 is cemented or glued by its plane surface to the side of the bottom 5.1 of the housing 1 facing the light source, wherein at least the cementing or gluing area of the bottom 5.1 must be transparent. As in the arrangement according to FIG. 1, the optical element 6 is preferably constructed as a spherical segment. However, there are also other possible constructions of the element 6 which are suitable for helping to meet the above-stated object.

According to another construction of the invention (not shown in the drawing), the optical element 6 and the bottom of the housing form an individual structural component part of optical plastic or glass, wherein the shape of the element is produced by cutting, e.g., grinding, or in a noncutting manner, e.g., by pressing.

Figure 3:
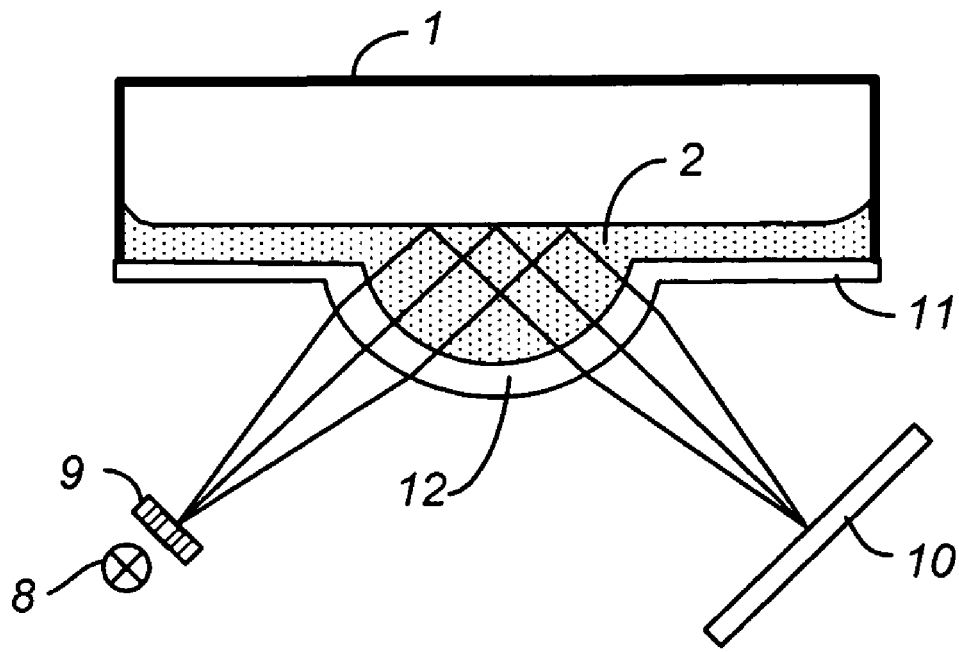
FIG. 3 shows a clinometer with a vessel bottom provided with a cup-shaped bulge.

In the embodiment of the optical clinometer according to FIG. 3, the bottom 11 of the housing 1 and the optical element which is formed as a cup-shaped bulge 12 of the bottom 11 likewise form an individual structural component part, wherein the volume of the bulge 12 is a component part of the volume of the housing 1 and is filled with liquid 2. This bulge 12 can advantageously be produced without cutting by pressing or deep drawing; it is important only that surfaces through which light is radiated should maintain their optical quality.

Figure 4:
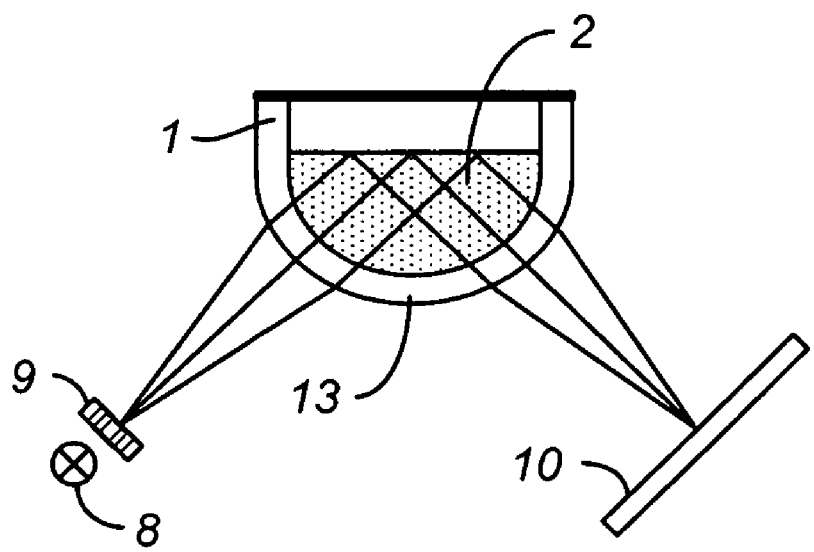
FIG. 4 shows a clinometer with a hemispherical vessel bottom.

FIG. 4 shows a construction of an optical clinometer according to the invention in which the bottom 13 of the housing 1 or vessel is constructed in a cup-shaped manner and, together with the rest of the housing 1, encloses a volume which is partly filled with the liquid.

Figure 5:
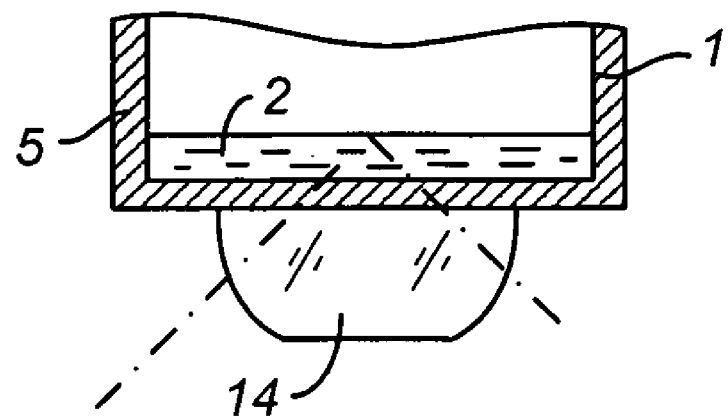
FIG. 5 shows a clinometer with an optical element constructed as a spherical layer.

FIG. 5 shows a clinometer with an optical element 14 constructed as a spherical segment or layer.

Figure 6:
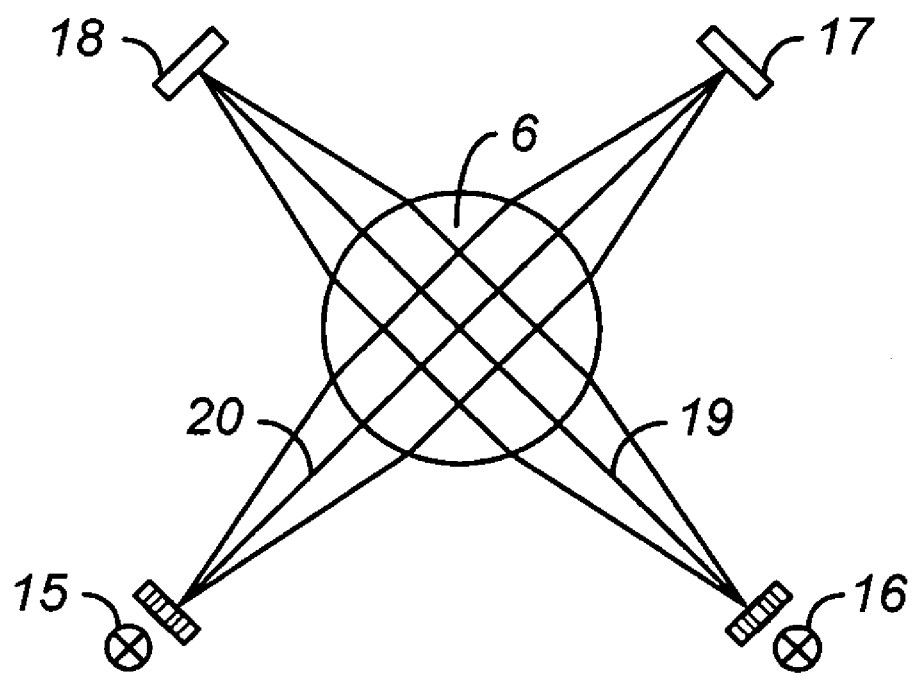
FIG. 6 is a bottom view of the clinometer with two light sources offset by 90° and sensor arrangements.

FIG. 6 shows a clinometer by which inclinations can be measured in two axes extending at an angle (90° in this case) to one another. In this construction, two light sources 15 and 16 and two associated sensor arrangements 17 and 18 are provided, one for each measurement direction. In an arrangement of this type, the advantage of the invention is particularly clear. A plurality of beam paths 19 and 20 are guided over the optical element 6 which is constructed as a thick lens without extra expenditure on optics.

The invention allows a very robust and dependable clinometer with few structural component parts; in particular, the optical element 6; 14 can assume several functions in different embodiments. On the one hand, it takes on the function of the collimator and on the other hand it forms an objective. A plurality of beam paths are guided in different directions via this structural component part.

While the foregoing description and drawings represent the present invention, it will be obvious to those skilled in the art that various changes may be made therein without departing from the true spirit and scope of the present invention.

What is claimed is:

1. An optical clinometer comprising:
   a housing or vessel with a transparent liquid which forms a liquid horizon and which is suitable for changing the direction of at least one optical beam bundle depending on inclination;
   at least one light source for illuminating at least one structure or for generating at least one light point or light spot; and
   optical means for imaging the at least one structure or the at least one light point or light spot through the liquid and by total reflection at the surface of the liquid on photoelectric sensor elements of at least one line-shaped or surface-shaped sensor arrangement;
   wherein the optical means for imaging the structure or the light point or light spot are arranged on the underside of the bottom of the housing or vessel or are a component part of this bottom;
   said optical means being formed of only one individual lens which couples light in and out and images the structure or the light point or light spot.

2. The optical clinometer according to claim 1, wherein the one individual lens has the form of a thick planoconvex lens, wherein its plane surface faces the liquid.

3. The optical clinometer according to claim 2, wherein the one individual lens is a spherical segment.

4. The optical clinometer according to claim 1, wherein the one individual lens is a spherical layer.

5. The optical clinometer according to claim 1, wherein the one individual lens is cemented or glued to the underside of the bottom.

6. The optical clinometer according to claim 1, wherein the one individual lens is made of an optical plastic or glass.

7. The optical clinometer according to claim 1, wherein the housing and the one individual lens form an individual component part of optical plastic or glass.

8. The optical clinometer according to claim 1, wherein the plane surface of the one individual lens adjoins the liquid.

9. The optical clinometer according to claim 1, wherein the housing or vessel has a cup-shaped bottom.

10. The optical clinometer according to claim 1, wherein the housing and the one individual lens form an individual part and the one individual lens is formed by a cup-shaped bulge in the bottom of the housing, wherein the volume of the cup-shaped bulge is a component part of the volume of the housing and is filled with the liquid.

11. The optical clinometer according to claim 1, wherein two or more light sources which are arranged at an angular offset relative to one another and sensor arrangements are provided for carrying out measurement of inclination in a plurality of coordinates.

12. An optical clinometer comprising:
    at least one light source configured to provide an optical beam propagating along an optical path;
    photoelectric sensor elements disposed along the optical path; and
    a housing disposed along the optical path and configured to receive a liquid, wherein the housing comprises:
        a bottom wall;
        one or more side walls joined to the bottom wall and confining the liquid to define a top liquid surface; and
        a lens coupled to the bottom wall along the optical path, wherein the optical path extends from the at least one light source through the lens, reflects off the top liquid surface, and passes through the lens to the photoelectric sensor elements.

13. The optical clinometer according to claim 12, wherein the lens has the form of a thick planoconvex lens, wherein its plane surface faces the liquid.

14. The optical clinometer according to claim 12, wherein the lens is cemented or glued to the bottom wall.

15. The optical clinometer according to claim 12, wherein the lens comprises an optical plastic or glass material.

16. The optical clinometer according to claim 12, wherein the housing and the lens form an individual component part of optical plastic or glass.

17. The optical clinometer according to claim 12, wherein a plane surface of the lens adjoins the liquid.

18. The optical clinometer according to claim 12, wherein the housing comprises at least one of a spherical bottom or a cup-shaped bottom.

19. The optical clinometer according to claim 12, wherein the at least one light source comprises a plurality of light sources, each of the plurality of light sources being arranged at an angular offset relative to one another and sensor arrangements are provided for carrying out measurement of inclination in a plurality of coordinates.

* * * * *